United States Patent
Buononato et al.

(10) Patent No.: US 7,455,865 B2
(45) Date of Patent: Nov. 25, 2008

(54) SHELF-STABLE FLAVORED OIL ENCAPSULATED SALT

(75) Inventors: Michael D. Buononato, Montgomery, NY (US); Steven B. Zavagli, New York, NY (US)

(73) Assignee: Wynn Starr Flavors, Inc., Allendale, NY (US)

(*) Notice: Subject to any disclaimer, the term of this patent is extended or adjusted under 35 U.S.C. 154(b) by 1017 days.

(21) Appl. No.: 10/829,496

(22) Filed: Apr. 22, 2004

(65) Prior Publication Data

US 2005/0238788 A1    Oct. 27, 2005

(51) Int. Cl.
 *A23L 1/22* (2006.01)
 *A23L 1/237* (2006.01)
(52) U.S. Cl. ............... 426/97; 426/99; 426/649; 426/650; 426/652

(58) Field of Classification Search ............... 426/97, 426/99, 649, 650, 652
See application file for complete search history.

(56) References Cited

U.S. PATENT DOCUMENTS

| | | | |
|---|---|---|---|
| 3,819,838 A | 6/1974 | Smith et al. |
| 3,985,913 A | 10/1976 | Johnson et al. |
| 4,262,027 A | 4/1981 | Tonner et al. |
| 4,276,312 A | 6/1981 | Merritt |
| 4,537,784 A | 8/1985 | Percel et al. |
| 4,576,825 A | 3/1986 | Tracy et al. |
| 4,803,092 A | 2/1989 | Weiss et al. |
| 5,268,191 A | 12/1993 | Crosby |
| 6,190,722 B1 | 2/2001 | Kim et al. |
| 6,416,799 B1 | 7/2002 | Porzio et al. |
| 6,495,184 B1 | 12/2002 | Zheng et al. |
| 6,544,574 B2 | 4/2003 | El-Khoury et al. |

*Primary Examiner*—Arthur L Corbin
(74) *Attorney, Agent, or Firm*—Brian E. Shaw, Esq.; Stephen B. Salai, Esq.; Harter Secrest & Emery LLP

(57) ABSTRACT

A food flavoring encapsulate includes an encapsulated substrate, such as salt, wherein the substrate is encapsulated by a flavored oil. The flavored oil incorporates a Maillard reaction product and is preferably substantially free of water.

19 Claims, 2 Drawing Sheets

SHELF-STABLE FLAVORED OIL ENCAPSULATED SALT

CROSS-REFERENCE TO RELATED APPLICATIONS

None.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to flavoring food products with an encapsulate and, particularly, to a flavored oil encapsulated substrate and, more particularly, to a salt encapsulated with an oil, wherein the oil includes a Maillard reaction product.

2. Description of Related Art

Encapsulation is often used in the food industry and typically involves coating an ingredient or substrate before introduction into a food system. Food ingredients are encapsulated for a variety of reasons, including protection of the ingredient from degradation during processing and storage, timed release of the ingredient, prevention of premature reactions between the ingredient and the food product, emulsification, at least partially controlled delivery of the ingredient into the food system, taste masking of vitamins and minerals, and suspension of ingredients.

U.S. Pat. No. 6,153,236 discloses a low melt encapsulate with a narrow melting point range, wherein encapsulation is accomplished from a fluidized bed reactor.

U.S. Pat. No. 4,537,784 discloses a particulate food acidulant having lactic acid plated onto a particulate calcium lactate carrier and a water insoluble, hard, edible, lipid coating at least substantially encapsulating the carrier and acid in an amount effective to prevent substantial release of the acid from the acidulant before the lipid coating melt.

However, the need exists for an encapsulation that can provide complex flavoring in addition to performing an encapsulating function. The need further exists for a shelf-stable oil encapsulation which can provide selected tastes or flavorings within a food product. The need also exists for an encapsulation of a substrate such as salt, wherein the salt can be incorporated into a food product without substantially limiting the shelf life of the food product.

BRIEF SUMMARY OF THE INVENTION

The present invention provides a flavored oil encapsulated ingredient and, more particularly, a flavored oil encapsulated salt. The encapsulated ingredient is set forth as an encapsulate, which includes both the encapsulated ingredient (substrate) and the encapsulating material. The present encapsulate provides an encapsulated salt which can be incorporated into a food product such as ground meat, to selectively distribute the flavor of the oil and expose the salt to the ground meat.

In a further configuration, the encapsulating oil is flavored by at least one Maillard reaction product. The Maillard reaction product is formed from the selected time and temperature heating of a reducing sugar and an amino acid in the presence of water. Thus, in one configuration, the present invention provides a food additive including a salt particle encapsulated in an oil having a Maillard reaction product.

Further, the present invention includes a method for forming an encapsulated substrate, such as a salt. The method includes forming a mixture of a reducing sugar and one of an amino acid and protein in water; adding the reducing sugar, the one of the amino acid and protein and water to an edible oil to form an unreacted mixture; heating the unreacted mixture for a sufficient time to produce a Maillard reaction within the oil, thereby forming a Maillard mixture; removing at least 95% of the moisture to form a Maillard mixture; and encapsulating a plurality of salt particles with the Maillard mixture.

BRIEF DESCRIPTION OF THE SEVERAL VIEWS OF THE DRAWING(S)

DETAILED DESCRIPTION OF THE INVENTION

Figure 1:
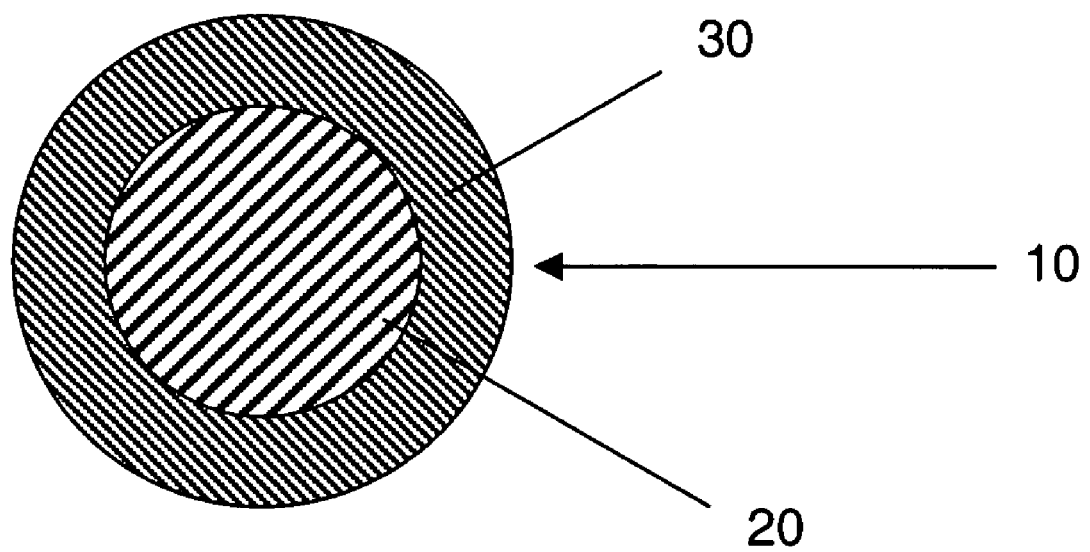
FIG. 1 is a schematic cross-sectional view of an encapsulated substrate.
Figure 2:
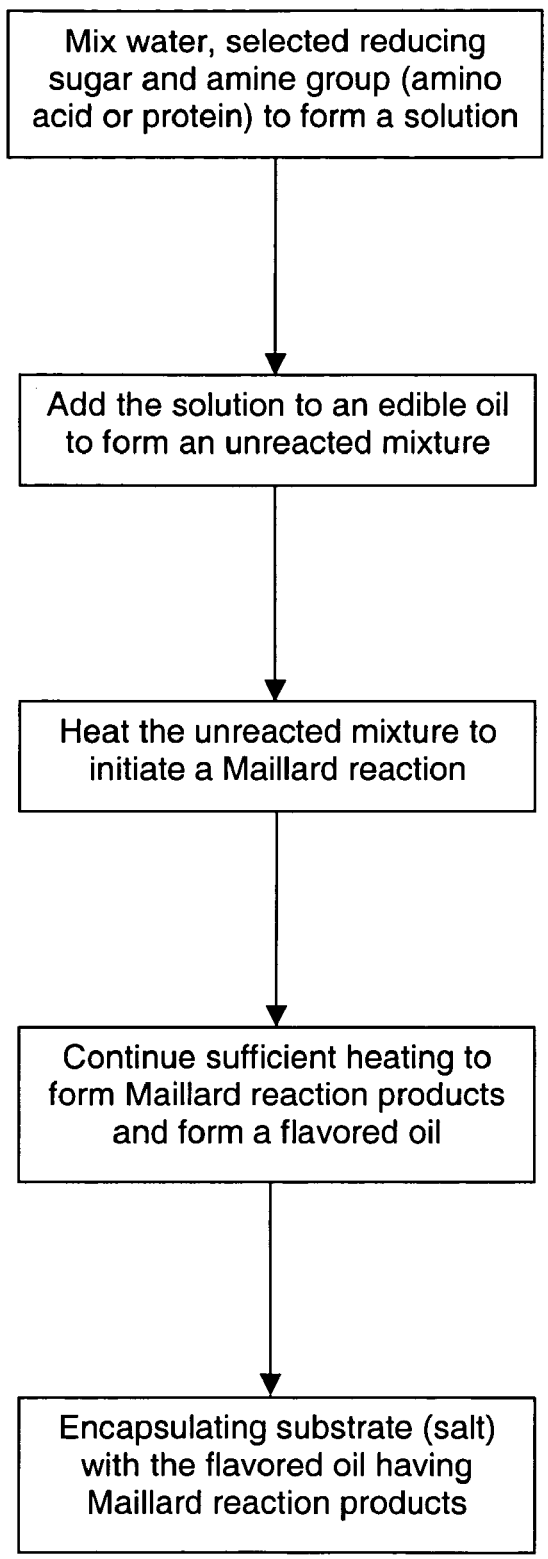
FIG. 2 is a flow chart of the process of forming the encapsulated substrate.

Referring to FIG. 1, an encapsulate 10 is provided, wherein the encapsulate includes a substrate 20 and an encapsulating coating 30. Preferably, the substrate 20 is provided with the coating 30 so as to encapsulate the substrate. As used herein, the term "encapsulate" includes the substrate 20 and the encapsulating coating 30.

Although the encapsulate 10 can be employed in a variety of food products, it is contemplated the present encapsulate is readily employed in a ground meat product. The encapsulate 10 has particular application in ground meat products in which salt is desired to be incorporated, yet oxidation of the fat within the ground meat from exposure to the salt is desired to be minimized or controlled. The encapsulate 10 can be readily incorporated into the ground meat product prior to refrigeration without exposing the ground meat to the salt. Thus, the encapsulate 10 can be homogeneously or uniformly distributed throughout the ground meat, wherein the ground meat product and encapsulate can then be refrigerated or frozen as desired.

The substrate 20 can be any of a variety of ingredients, such as amino acids, ascorbic acid, calcium lactate, citric acid, potassium sorbate, hydrocolloids, iron, lactic acid and sodium chloride. A preferred substrate 20 is sodium chloride. While the sodium chloride can be any of the variety of sizes, a typical particle size for the sodium chloride is between approximately 8 mesh and approximately 12 mesh.

The encapsulating coating 30 is preferably an encapsulating oil and is also designated as reference number 30. The encapsulating oil 30 can be any of a variety of types of edible oil, in which a Maillard reaction can occur. Available oils include vegetable oils, hydrogenated vegetable oils such as soybean oil, peanut oil, hylaurate vegetable oils, cottonseed oil or palm oil. In addition, the edible oils can include animal oils such as, but not limited to, tallow. Further, the encapsulating oil can be a mixture of various vegetable oils, vegetable and animal oils or animal oils. For example, tallow and a vegetable oil, such as cottonseed oil, can be employed as the encapsulating oil.

The encapsulating oil 30 preferably carries a Maillard reaction product. Although the Maillard reaction product can be incorporated from external processes, it has been found advantageous to generate the Maillard reaction product within the encapsulating oil 30. Thus, prior to encapsulation, a Maillard reaction product is introduced into the encapsulating oil 30.

The Maillard reaction product results from the initiation and occurrence of the Maillard reaction. In one configuration, the Maillard reaction is initiated in the oil. Generally, a reducing sugar and one of an amino acid or protein is mixed with water and added to the oil.

The Maillard reaction is one of four non-enzymatic browning reactions which occur in food. While the Maillard reaction is principally described in terms of reducing sugars and amino acids, it is contemplated that the Maillard reaction can include other carbohydrates and amine groups. For example, alternative sugar sources include dextrose, fructose, high fructose corn syrup, sucrose corn starches and mutodextrine. The amine groups can be in the form of protein sources such as milk solids, cream, egg solids, nuts, nut fragments, coca solids, and butter as well as fruits and fruit juices to provide free amino acids, gelatin, whey proteins and emulsifiers such as lecithin.

Generally, the reducing sugar and the amino acid are mixed with water to provide a solution. Preferably, the reducing sugar and amino acid are soluble with water to form the solution. The water, amino acid and sugar solution is then mixed with the edible oil to form an unreacted mixture. For example, the oil soluble materials are dissolved in the oil, and the water soluble ingredients are dissolved in the water. These solutions are then combined, with agitation, and subsequently reacted.

Specifically, the unreacted mixture is heated at a sufficient time and temperature to initiate the Maillard reaction and produce at least one Maillard reaction product. Sufficient heat is applied to drive off substantially all of the water. Preferably, at least 95% of the water is removed; and in a more preferred configuration, at least 98%, and in a most preferred configuration, at least 99% of the water is removed.

It has been found that the temperature profile of the edible oil, reducing sugar, amino acid (protein) and water can be at least partially controlled by the initial amount of water. That is, as boiling off of the water occurs at 212° F., the temperature for initiating the Maillard reaction can be controlled by the amount of water to be driven off.

After completion of the Maillard reaction and formation of the desired Maillard reaction products, heating is terminated and the now flavored oil is cooled. That is, the oil includes the Maillard reaction products. The cooled flavored oil is then employed for coating the substrate.

Subsequently, the substrate (salt) is encapsulated with the oil flavored with the Maillard reaction products. While the use of a fluidized bed reactor is set forth, it is understood that other encapsulation processes such as spray drying, spray chilling, and spinning disc can be used.

In the fluidized bed reactor, the air flow passing through the fluidized bed is adjusted so that the substrate particles are slightly levitated. The liquidized and free flowing flavored oil is then sprayed over the salt in the fluidized bed, thereby encapsulating the salt. The fluidized air levitating the substrate (salt) is cooled, thereby causing the oil to solidify and encapsulate the substrate (salt).

After the desired amount of coating is applied, the encapsulated substrate 20 is then removed from the fluidized bed, sifted for size and packaged under appropriate conditions to protect the encapsulate 10. Typical available packaging for the encapsulate includes polyethylene-lined cardboard containers.

In a particular application, the present encapsulate 10 is employed in ground meat, wherein the encapsulated salt can be incorporated into the ground meat prior to chilling or freezing of the meat, thereby allowing homogeneous dispersion of the encapsulate 10 throughout the ground meat product. Thus, as the salt is precluded from contact with the ground meat, there is no oxidation of the fat in the meat. As the flavor (Maillard reaction products) in the oil is relatively concentrated, the need to add additional fat is reduced. Further, as subsequent flavoring steps (which can introduce fat-based flavors) is reduced, the fat content of the ground meat product is lowered. In addition, the ability to introduce the encapsulate 10 to the ground meat prior to freezing allows homogeneous distribution throughout the ground meat, thereby reducing "pocketing" of the salt or flavoring within the ground meat product.

In one application, the following ingredients are employed:

| Ingredient | Percentage by Weight |
| --- | --- |
| Partially hydrogenated soybean oil | 13.23 |
| L-threonine | 0.05 |
| L-methionine | 0.01 |
| L-serine | 0.03 |
| Thiamine | 0.04 |
| Xylose | 0.04 |
| Tocopherols | 0.01 |
| Water | 6.95 |
| Flour salt | 79.64 |
| Total: | 100.00 |

In this configuration, the L-threonine, L-methionine, L-serine, Xylose and Thiamine are dissolved in the water to form a blend.

The blend is then added to the partially hydrogenated soybean oil and heated to a medium boil approximately 210°-215° Fahrenheit. In an alternative configuration, the partially hydrogenated soybean oil can be replaced with a blend of tallow and cottonseed oil.

The medium boil is continued until all of the water has been removed. Typically, the temperature will climb to approximately 240°-250° F. During this time, the Maillard reaction has occurred and the reaction products are carried by the oil. Thus, the encapsulating oil is flavored with the Maillard reaction products.

The flavored oil is then cooled to approximately 140° F. and the tocopherols (oil preservatives) can be added. Subsequently, the flavored oil is stored in containers and refrigerated for subsequent encapsulation of the substrate, such as salt.

Certain combinations of the amino acids and sugar in conjunction with cooking times and temperatures can provide distinct tastes. For example, it has been found the L-methionine and the Xylose, when heated at a relatively low temperature for a relatively short time, produced a distinct potato flavor.

Further, the relative temperature of the Maillard reaction can be controlled by the amount of water initially introduced. That is, by increasing the initial amount of water, the time required at a relatively low temperature (212° F.) can be increased.

As the flavoring of the oil is a Maillard reaction product, the encapsulating oil is a free-flowing, dry, shelf-stable additive which can be readily added to the ground meat product to provide for homogeneous incorporation. As the ground meat product is subsequently heated, the edible oil melts, thereby releasing the flavor of the Maillard reaction products and the encapsulated salt.

Representative flavors include butter, roasted garlic, tallow, sauteed vegetables, and seasoned meats such as beef, poultry, fish, and pork.

Thus, while there have been described what are presently believed to be the preferred embodiments of the present invention, those skilled in the art will realize that other and further embodiments can be made without departing from the spirit and scope of the invention, and it is intended to include all such further modifications and changes as come within the true scope of the invention.

The invention claimed is:

1. A method of forming a shelf-stable encapsulated salt for incorporation into a ground meat food product, the method comprising:
   (a) heating a mixture of a reducing sugar, an amino acid, water and an edible oil to produce a Maillard reaction and form a Maillard mixture; and
   (b) encapsulating a salt particle with the Maillard mixture.

2. The method of claim 1, further comprising at least partially controlling the heating of the mixture by an initial amount of water mixed with the reducing sugar, the amino acid and the edible oil.

3. The method of claim 2, further comprising heating the Maillard mixture to remove at least 95% of the water.

4. The method of claim 1, further comprising cooling the Maillard mixture prior to encapsulating the salt.

5. The method of claim 1, further comprising incorporating the encapsulated salt into a ground meat product.

6. The method of claim 1, further comprising adding an oil preservative after forming the Maillard mixture and before encapsulating the salt.

7. A method of forming a shelf-stable encapsulated salt, the method comprising:
   (a) forming a mixture of a reducing sugar and one of an amino acid and protein in water;
   (b) adding the reducing sugar, the one of the amino acid and protein and the water to an edible oil to form an unreacted mixture;
   (c) heating the unreacted mixture for a time sufficient to produce a Maillard reaction and remove at least 95% of the moisture to form a Maillard mixture; and
   (d) encapsulating a plurality of salt particles with the Maillard mixture.

8. The method of claim 7, further comprising removing at least 99% of the water from the Maillard mixture.

9. The method of claim 7, further comprising adding a preservative after formation of the Maillard mixture and prior to encapsulating the plurality of salt particles.

10. The method of claim 7, further comprising at least partially controlling the heating of the unreacted mixture by controlling the amount of water in the unreacted mixture.

11. A food additive, comprising:
    (a) a salt particle; and
    (b) an encapsulating oil surrounding the salt particle, the encapsulating oil including a Maillard reaction product formed from an amino acid and a reducing sugar.

12. The food additive of claim 11, wherein the encapsulating oil has less than 5% water by weight.

13. The food additive of claim 11, wherein the encapsulating oil has less than 1% water by weight.

14. The food additive of claim 11, wherein the salt particle is sodium chloride.

15. The food additive of claim 11, wherein the encapsulating oil includes a preservative.

16. The food additive of claim 11, wherein the encapsulating oil includes sufficient preservative to be shelf stable.

17. The food additive of claim 11, wherein the Maillard reaction is formed from a protein, containing an amino acid, and a reducing sugar.

18. The food additive of claim 11, wherein the amino acid is at least one of threonine, methionine and serine.

19. The food additive of claim 11, wherein the reaction product is formed from xylose and an amino acid.

* * * * *